(12) United States Patent
Holmes et al.

(10) Patent No.: US 11,587,208 B2
(45) Date of Patent: Feb. 21, 2023

(54) HIGH QUALITY UI ELEMENTS WITH FRAME EXTRAPOLATION

(71) Applicant: QUALCOMM Incorporated, San Diego, CA (US)

(72) Inventors: Samuel Benjamin Holmes, Sterling, MA (US); Jonathan Wicks, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/331,530

(22) Filed: May 26, 2021

(65) Prior Publication Data
US 2022/0383454 A1 Dec. 1, 2022

(51) Int. Cl.
*G06T 5/00* (2006.01)
*G06T 5/50* (2006.01)
*G09G 5/377* (2006.01)

(52) U.S. Cl.
CPC .............. *G06T 5/002* (2013.01); *G06T 5/50* (2013.01); *G09G 5/377* (2013.01)

(58) Field of Classification Search
CPC ............ G06T 5/002; G06T 5/50; G09G 5/377
See application file for complete search history.

(56) References Cited

U.S. PATENT DOCUMENTS

2003/0128337 A1* 7/2003 Jaynes .................... G03B 21/26
353/30
2003/0215011 A1* 11/2003 Wang ...................... H04N 19/40
375/E7.14
2005/0151743 A1* 7/2005 Sitrick .................... H04N 5/272
345/670

(Continued)

FOREIGN PATENT DOCUMENTS

EP 3002941 A1 4/2016
EP 3376467 A1 * 9/2018 ............... G06T 3/40

(Continued)

OTHER PUBLICATIONS

Boos, K., Chu, D., & Cuervo, E. (Jun. 2016). Flashback: Immersive virtual reality on mobile devices via rendering memoization. In Proceedings of the 14th Annual International Conference on Mobile Systems, Applications, and Services (pp. 291-304).*

(Continued)

*Primary Examiner* — Sarah Lhymn
(74) *Attorney, Agent, or Firm* — Qualcomm Incorporated (57) ABSTRACT

A frame processor may generate a mask based on one or more static regions of a first set of frames of a plurality of previous frame and adjust the mask to at least one of determine alpha data or conceal distorted content associated with the one or more static regions of the first set of frames. The distorted content may be caused by extrapolation of a frame from a second set of frames of the plurality of previous frames. The frame processor may generate a composite frame based on application of at least one of the mask or the alpha data to a previous frame of the plurality of frames, and application of the previous frame based on the at least one of the mask or the alpha data to the frame extrapolated from the second set of frames of the plurality of previous frames.

26 Claims, 7 Drawing Sheets

(56) References Cited

U.S. PATENT DOCUMENTS

| | | | | |
|---|---|---|---|---|
| 2014/0211842 A1* | 7/2014 | Zhao | ............... | H04N 19/147 |
| | | | | 375/240.02 |
| 2014/0226900 A1* | 8/2014 | Saban | ............... | G06T 11/00 |
| | | | | 382/165 |
| 2015/0117540 A1* | 4/2015 | Morimoto | ............ | H04N 19/543 |
| | | | | 375/240.16 |
| 2015/0146097 A1 | 5/2015 | Izumi | | |
| 2016/0100129 A1 | 4/2016 | Im | | |
| 2017/0188002 A1* | 6/2017 | Chan | ............... | G06V 10/28 |
| 2017/0323433 A1 | 11/2017 | Ukil et al. | | |
| 2018/0012333 A1* | 1/2018 | Urban | ............ | G06T 3/40 |
| 2020/0111195 A1* | 4/2020 | Vlachos | ............ | G06F 3/012 |

FOREIGN PATENT DOCUMENTS

| WO | 0177871 A1 | 10/2001 | | |
|---|---|---|---|---|
| WO | 2008106995 A1 | 9/2008 | | |
| WO | WO-2015192117 A1 * | 12/2015 | ............ | A63F 13/00 |
| WO | WO-2021230872 A1 * | 11/2021 | ......... | G06F 16/9577 |

OTHER PUBLICATIONS

Li, S., Fang, J., Xu, H., & Xue, J. (2020). Video frame prediction by deep multi-branch mask network. IEEE Transactions on Circuits and Systems for Video Technology, 31(4), 1283-1295.*

Fukunaga S., et al., "Text of ISO/IEC 14496-2 Video Verification Model V.12", 46, MPEG Meeting, Jul. 12, 1998-Nov. 12, 1998, Rome, (Motion Picture Expert Group or ISO/IEC JTC1/SC29/WG11), No. N2552, Feb. 16, 1999, XP030010905, 352 Pages, Paragraph [3.2.7.2.1] —Paragraph [3.2.7.2.1.6].

International Search Report and Written Opinion—PCT/US2022/030955—ISA/EPO—dated Sep. 19, 2022.

Kwatra V., et al., "Graphcut Textures: image and Video Synthesis Using Graph Cuts", ACM Transactions on Graphics, ACM, US, vol. 22, No. 3, Jul. 1, 2003, XP002379286, pp. 277-286.

Pandey A., et al., "Image Mosaicing: A Deeper Insight", Image and Vision Computing, Elsevier, Guildford, GB, vol. 89, Aug. 2, 2019, XP085809155, pp. 236-257, Paragraph [3.2.1].

* cited by examiner

HIGH QUALITY UI ELEMENTS WITH FRAME EXTRAPOLATION

TECHNICAL FIELD

The present disclosure relates generally to processing systems, and more particularly, to one or more techniques for frame processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Frame extrapolation procedures may be performed to reduce a rendering load of a GPU. However, user interface (UI) elements included in previously rendered frames may be distorted in extrapolated frames. Accordingly, there is a need for improved frame extrapolation techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may generate a mask based on one or more static regions of a first set of frames of a plurality of previous frame; adjust the mask to conceal distorted content associated with the one or more static regions of the first set of frames, the distorted content caused by extrapolation of a frame from a second set of frames of the plurality of previous frames, wherein alpha data is further determined based on adjustment to the mask; and generate a composite frame based on application of at least one of the mask or the alpha data to a previous frame of the plurality of frames, and application of the previous frame based on the at least one of the mask or the alpha data to the frame extrapolated from the second set of frames of the plurality of previous frames.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Frames of an application, such as a video game, may be rendered by a GPU and provided to a display device for displaying rendered content to an end user. Frame extrapolation may be performed to generate a subset of frames for reducing a rendering load of the GPU. Frame extrapolation may include analyzing one or more previously rendered frames to generate an extrapolated/subsequent frame as an alternative to rendering the subsequent frame based on the sample values for the graphical objects included in the frame. In this manner, a number of frames rendered by the GPU based on the sample values for the graphical objects may be reduced, as the GPU may not have to fully render each frame indicated by the application.

Frame extrapolation may be used in games, video players, or other applications that utilize user interface (UI) elements. UI elements included in previously rendered frames may be distorted in extrapolated frames, as the UI elements may not be registered as stationary objects and/or may be grouped with extrapolated moving background content. For example, an extrapolated block of pixels may include a first number of pixels associated with moving content and a second number of pixels associated with non-moving content. When the entire block of pixels is indicated as being either a moving content block or a non-moving content block, distortion may occur to a subset of the pixels associated with the opposite characteristics. As a result, the UI elements may appear to be distorted in the extrapolated frame. "Distorted content" refers to content that is stretched to different pixels in a subsequent frame than the content corresponded to in a previous frame.

To decrease artifacts and distortions, a mask may be generated that corresponds to static regions of the previously rendered frames. A quality of the mask may be increased based on increasing a temporal spacing between the previously rendered frames used to generate the mask and/or based on increasing a total number of frames used to generate the mask. The generated mask may be grown and feathered/blurred to provide a blended transition between masked regions of the extrapolated frame (e.g., associated with static content) and non-masked regions of the extrapolated frame (e.g., associated with non-static content). "Static content" may refer to content, such as a UI element, that remains in a relatively fixed position on a display over a number of consecutive frames. While some UI elements may be more static than background content, the UI elements may not be completely static in some cases, but may still appear as a whole to have a relatively fixed position on the display over the number of consecutive frames.

A composite frame may be generated by overlaying a masked portion of a previous frame onto the extrapolated frame. Alpha channel data determined from a growing and feathering procedure of the mask may be used to adjust an opaqueness around the edges of the masked portion of the previous frame (e.g., to provide the blended transitions between the masked portion of the previous frame and the extrapolated frame). The composited frame may be perceived by the end user as including the regions of the extrapolated frame where the content was determined to be moving, and the regions of the previous frame (e.g., most recently rendered frame) where the content was determined to be static. Thus, the composited frame may provide a modified extrapolated frame that includes a reduced number of artifacts and distortions associated with the UI elements.

Figure 1:
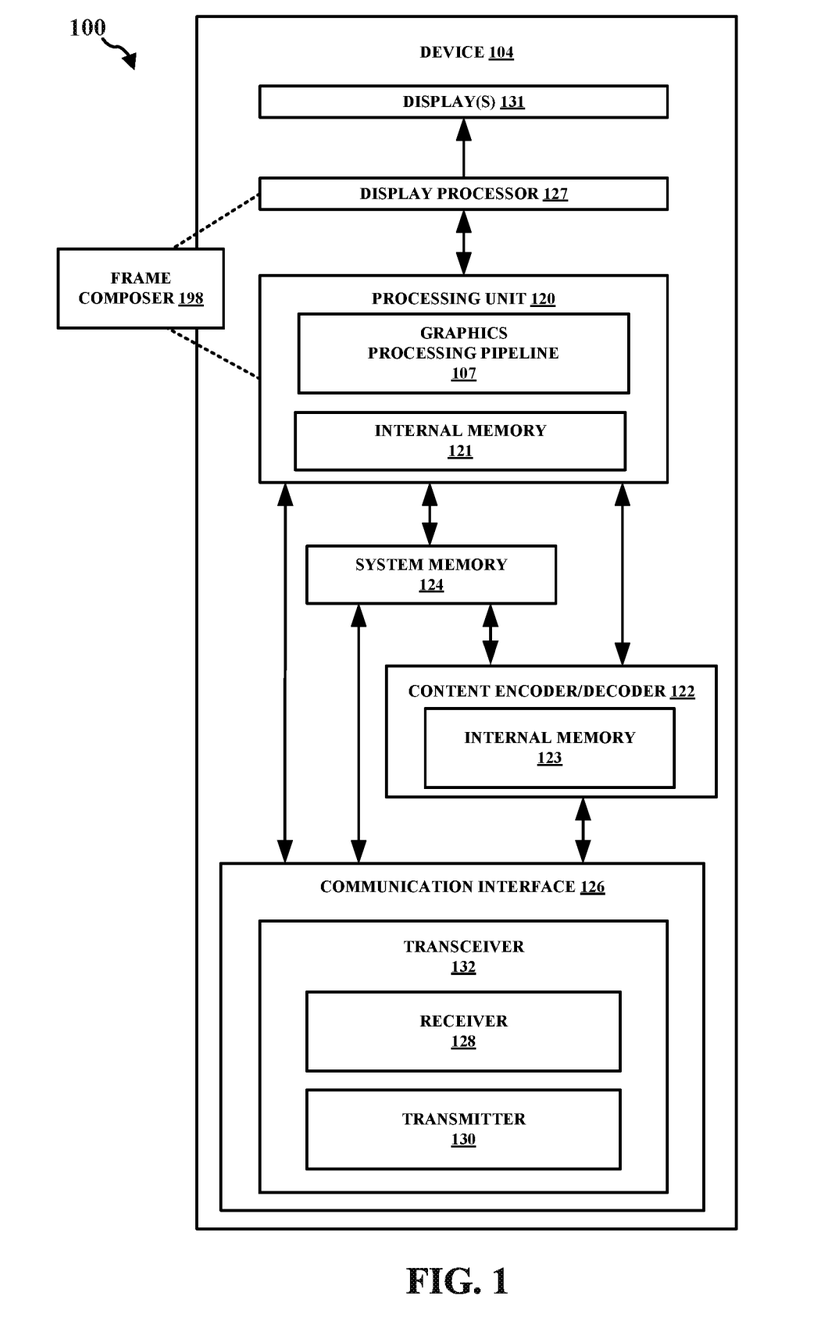
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 or the processing unit 120 (e.g., GPU, CPU, etc.) may include a frame composer 198, which may include software, hardware, or a combination thereof configured to generate a mask based on one or more static regions of a first set of frames of a plurality of previous frame; adjust the mask to at least one of determine alpha data or conceal distorted content associated with the one or more static regions of the first set of frames, the distorted content caused by extrapolation of a frame from a second set of frames of the plurality of previous frames; and generate a composite frame based on application of at least one of the mask or the alpha data to a previous frame of the plurality of frames, and application of the previous frame based on the at least one of the mask or the alpha data to the frame extrapolated from the second set of frames of the plurality of previous frames. Although the following description may be focused on frame processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
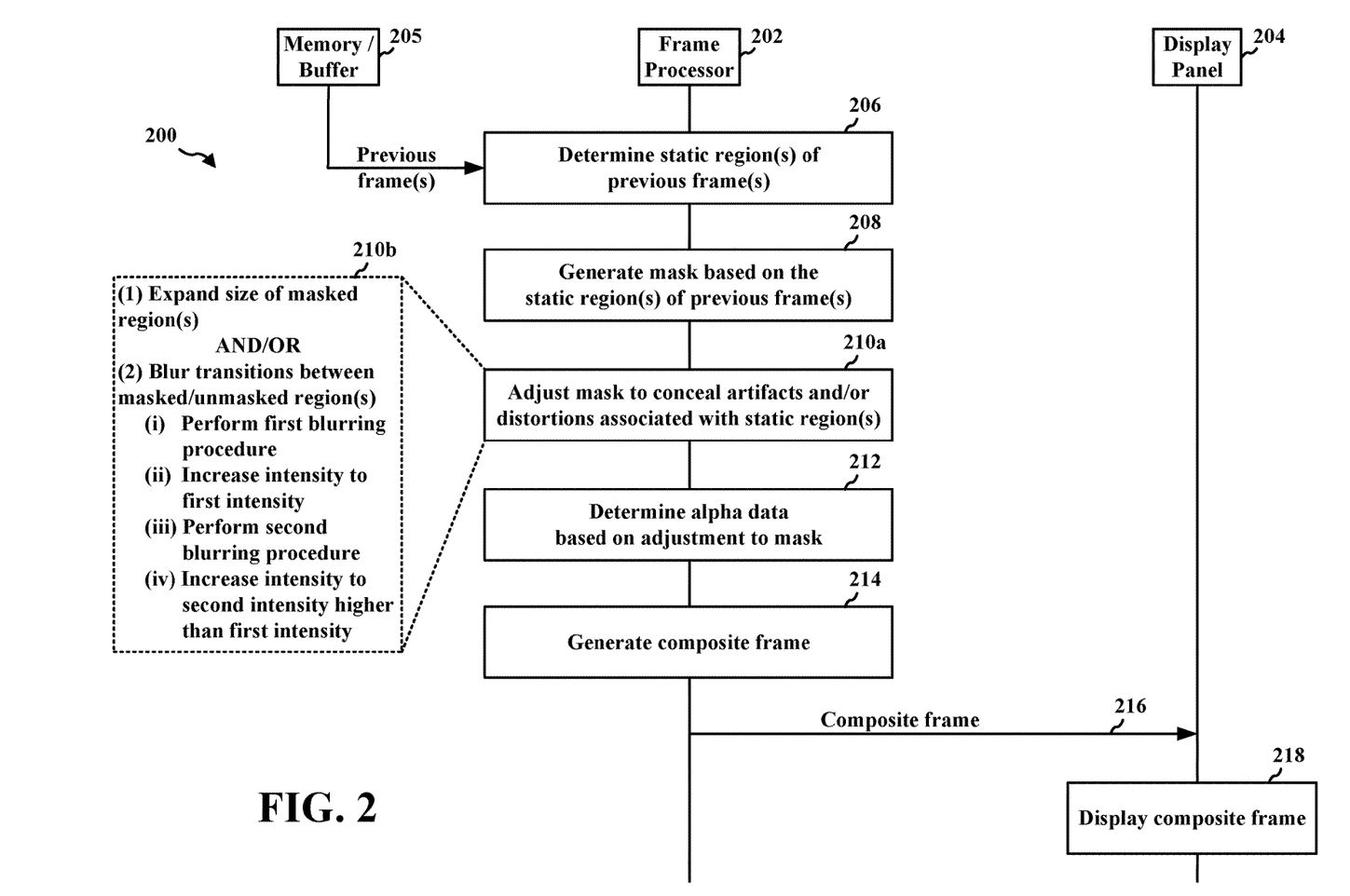
FIG. 2 is a call flow diagram illustrating example communications between a frame processor and a display panel in accordance with one or more techniques of this disclosure.

FIG. 2 is a call flow diagram 200 illustrating example communications between a frame processor 202 and a display panel 204 in accordance with one or more techniques of this disclosure. In examples, the frame processor 202 may correspond to a processor such as the display processor 127 or the processing unit 120 that include the frame composer 198. At 206, the frame processor 202 may determine static region(s) of previous frame(s) of an application. The previous frame(s) may be stored in a memory/buffer 205 from which the frame processor 202 may receive the previous frame(s) to determine, at 206, the static regions of the previous frame(s). In aspects, the static regions of the previous frames may be associated with stationary UI elements that are overlaid on moving background content.

At 208, the frame processor 202 may generate a mask based on the static region(s) of the previous frame(s). The mask may be generated, at 208, for covering artifacts and/or distortions associated with the static regions (e.g., UI elements), which may be caused by moving (i.e., non-static) background content of an extrapolated frame. Distortion may occur when content is stretched to different pixels in a current frame than the content corresponded to in a previous frame. For example, if an entire block of extrapolated pixels is associated with moving content, but some of the pixels in the block actually correspond to non-moving content, processing the pixels that correspond to the non-moving content as moving content may cause the non-moving content to appear stretched/distorted. "Artifacts" refers to visual anomalies in a graphical representation of a frame that are noticeable to an end user. Artifacts may occur based on unintended alterations to data in digital processing procedures. The mask generated, at 208, is a representation of the static regions from the previous frame(s), such that the mask may be overlaid on the extrapolated frame to cover/conceal the static regions of the extrapolated frame with the static regions of the previous frames(s), as represented via the mask.

At 210a, the frame processor 202 may adjust the mask to conceal the artifacts and/or distortions associated with the static region(s) of the previous frame(s). The adjustment, at 210a, may be based on one or more procedures performed, at 210b. For example, adjusting the mask, at 210a, may include expanding, at 210b(1), a size of the masked region(s) and/or blurring, at 210b(2), transitions between masked/unmasked region(s) of the previous frame(s). In examples, the blurring procedure performed, at 210b(2), may include a plurality of sub-procedures. For instance, the frame processor 202 may perform, at 210b(2)(i), a first blurring procedure. The frame processor 202 may also increase, at 210b(2)(ii), an intensity of the mask after performing, at 210b(2)(i), the first blurring procedure. The frame processor 202 may further perform, at 210b(2)(iii), a second blurring procedure after increasing, at 210b(2)(ii), the intensity of the mask to the first intensity. The frame processor 202 also further increase, at 210b(2)(iv), the intensity of the mask to a second intensity higher than the first intensity after performing, at 210b(2)(iii), the second blurring procedure. Blurring and intensifying the mask in increments may provide a smoother transition between the mask, which represents the static regions of the previous frames(s), and the moving background content of the extrapolated frame, in comparison to performing all the blurring at once followed by all the intensification.

At 212, the frame processor 202 may determine alpha data based on the adjustment, at 210a-210b, to the mask. "Alpha data" refers to a portion of the pixel data that is reserved for transparency information. Thus, the alpha data may indicate an extent to which a color of a first pixel is to be merged with a color of a second pixel when the first pixel is overlaid on the second pixel. The alpha data may be used to adjust an opaqueness around the edges of the masked regions of the previous frame(s) and may be applied with respect to a most recently rendered frame to generate an overlay for the static region(s) of the extrapolated frame. Accordingly, a composite frame may be generated, at 214, based on applying the overlay to the extrapolated frame. At 216, the composite frame may be transmitted to the display panel 204, which may display the composite frame, at 218.

Figure 3:
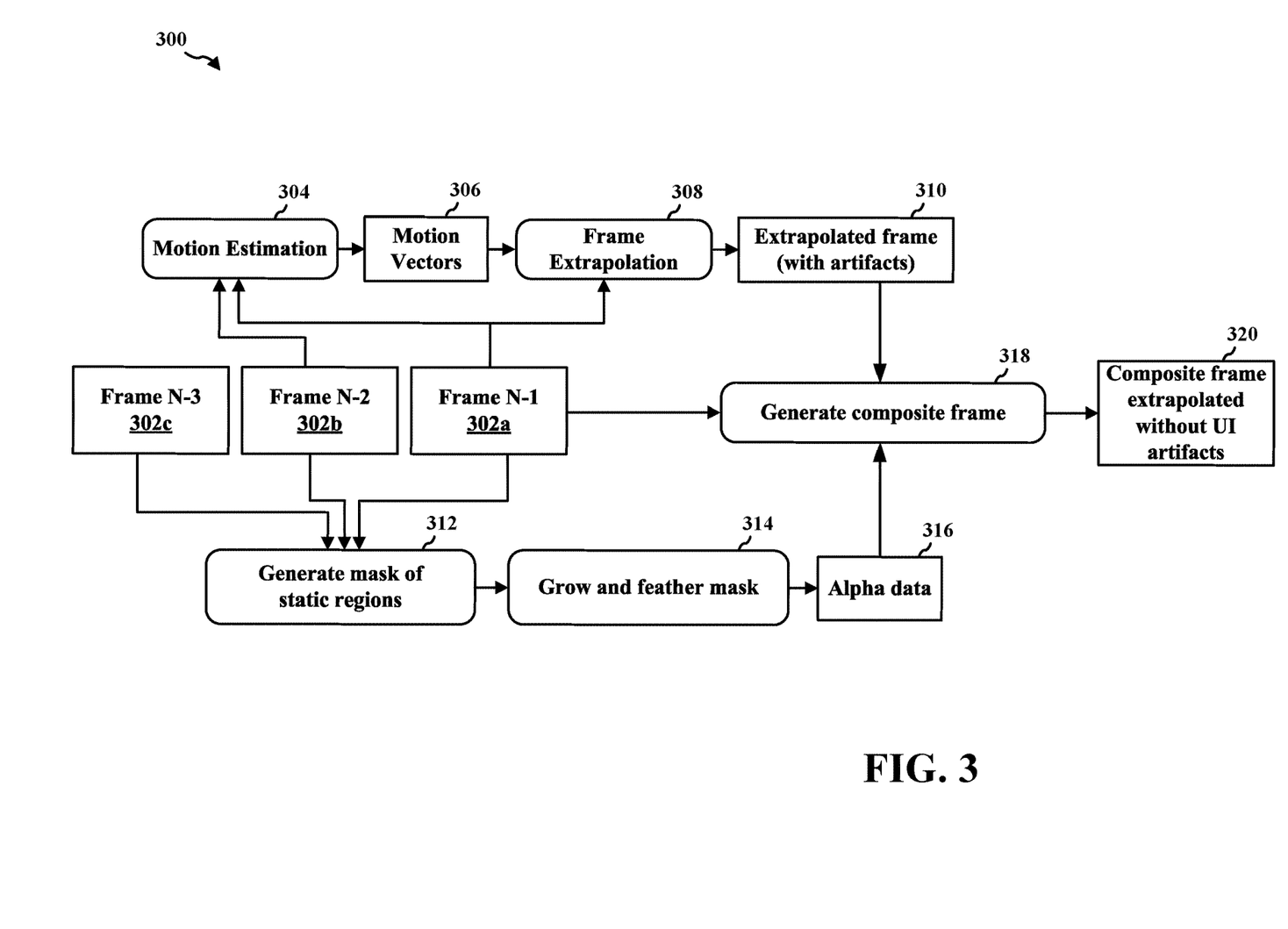
FIG. 3 illustrates a diagram of a frame extrapolation procedure in accordance with one or more techniques of this disclosure.

FIG. 3 illustrates a diagram 300 of a frame extrapolation procedure in accordance with one or more techniques of this disclosure. Frames of an application, such as a video game, may be rendered by a GPU and provided to a display device for displaying rendered content to an end user. In some cases, the GPU may render each frame of the application for providing the rendered content to the display device. The content may include graphical content, extended reality (XR) content, etc. In further cases, the frames/content may be received from a server (e.g., content streamed from a cloud server).

Frame extrapolation 308 may be performed to reduce a rendering load of a GPU by extrapolating content from a previously rendered frame of an application, such as frame N−1 302a, to generate a subsequent frame (e.g., extrapolated frame 310) of the application. That is, frame extrapolation 308 may include analyzing one or more previously rendered frames to generate an extrapolated frame 310 as an alternative to rendering a subsequent frame based on all the values for the graphical objects included in the frame. In this manner, a number of frames rendered by the GPU based on all the values for the graphical objects may be reduced, as the GPU may not have to fully render each frame indicated by the application. Reducing the number of frames rendered by the GPU may conserve power at the GPU. However, in some cases, the extrapolated frame 310 may include artifacts and/or distortions. Frame extrapolation 308 may also be performed in cases where an available bandwidth is insufficient to render each frame of the application, or in cases where the frame rate is to be increased (e.g., some frames may include complexities that may cause the GPU to be unable to render content at a high enough frame rate).

Frame extrapolation 308 may be similar to frame rate conversion, where intermediate frames may be generated based on an analysis of other frames. For example, a video frame processing rate may be increased from 30 frames per second (FPS) to 60 FPS based on generation of the intermediate frames. Frame extrapolation 308 may be different from frame rate conversion in that future frames are generated/extrapolated based on one or more past frames. However, information indicative of a future frame may be referenced to perform the extrapolation process from the one or more past frames to provide an expected frame, rather than rendering the expected frame. Frame extrapolation 308 may be performed based on a two-step procedure. First, past frames, such as frame N−1 302a and frame N−2 302b, may be analyzed to determine regions of the past frames that appear to be moving. Motion estimation 304 for the past frames may be performed to determine motion vectors 306 indicative of the moving regions of the past frames. Second, information indicative of moving regions of the past frames (e.g., the motion vectors 306) may be applied to a mostly recently rendered past frame (e.g., frame N−1 302a) to mesh render the moving regions with an expected location of the moving regions in a current frame (e.g., extrapolated frame 310). A "mesh" refers to a set of vertices, edges, and faces that correspond to a three-dimensional (3D) object of a frame. "Mesh rendering" refers to utilizing the mesh/geometry of the 3D object to render the 3D object at a particular position in the frame.

UI elements included in the most recently rendered frame (e.g., frame N−1 302a) may cause artifacts and/or distortions in the extrapolated frame 310, as the UI elements may not be registered as stationary objects and/or the UI elements may be linked to moving background content. When a stationary UI element is arranged on top of moving background content, distortions to the stationary UI element caused by frame extrapolation 308 may be perceivable to the end user. Such distortions may be based on performing the motion estimation 304 for objects of the frame based on a level of granularity that is larger than a per pixel basis. For example, the motion vectors 306 may correspond to an 8×8 block of pixels, such that the block of extrapolated content may include a first portion of the block associated with moving content and a second portion of the block associated with non-moving content. That is, a first portion of the block may be moving background content and a second portion of the block may be non-moving foreground content. Indicating the entire block to be either moving content or non-moving content, for frame extrapolation purposes, may cause distortion and/or artifacts in the extrapolated frame 310 when a subset of the pixels included in the block corresponds to the opposite characteristic (e.g., opposite of the moving/non-moving indication assigned to the entire block).

Even if per pixel motion vectors are used for extrapolating a frame, artifacts and distortions may still occur when translucent content is located on top of moving background content. Thus, even if the frame is extrapolated at a pixel level for mesh rendering the frame, edges of stationary UI elements may appear to be distorted when overlaid on moving background content. Although background content may be rendered separately from UI elements for some games/applications, such separation may not be determinable when performing the frame extrapolation 308. For example, in cloud rendering cases, the background content and the UI elements may be received together as a single frame to be displayed by the display device. Thus, when frame extrapolation 308 is performed based on a prior frame (e.g., frame N−1 302a), the background content and the UI element may not be associated with separate passes. A game engine may be similarly configured to receive the background content together with the UI elements (e.g., in non-streaming cases).

To decrease the artifacts and/or distortions, a mask may be generated, at 312, that corresponds to static regions of previously rendered frames (e.g., frame N−1 302a, frame N−2 302b, frame N−3 302c, etc.). A quality of the mask may be increased based on increasing a temporal separation between the previously rendered frames. For example, the mask may be generated based on a temporal separation of 50 frames via frame N−1 302a, frame N−51, and frame N−101. The quality of the mask may also be increased by increasing a total number of frames used to generate the mask at 312 (e.g., the mask may be generated, at 312, based on 4 or more frames, rather than the 3 previously rendered frames N−1 302a, N−2 302b, and N−3 302c).

The generated mask may be grown and feathered/blurred, at 314. Grown and feathered/blurred refers to increasing a size of a mask for one or more masked regions of a previously rendered frame (e.g., frame N−1 302a), while providing a blended transition between the one or more masked regions of the previously rendered frame (e.g., associated with the static features of the previously rendered frame N−1 302a) and one or more unmasked regions corresponding to the extrapolated frame 310 (e.g., associated with non-static features of the previously rendered frames N−1 302a and N−2 302b). A composite frame 320 may be generated, at 318, based on applying alpha data 316 determined from the growing and feathering/blurring, at 314, to the masked regions of the most recently rendered frame (e.g., frame N−1 302a) to generate an overlay frame for the extrapolated frame 310. That is, the composited frame 320 may be perceived as including the unmasked regions of the extrapolated frame 310 where the content was determined to be moving, and the masked regions of the most recently rendered frame (e.g., frame N−1 302a) where the content was determined to be static. Thus, the composited frame 320 may include a reduced number of artifacts and/or distortions caused by the UI elements.

Figure 4:
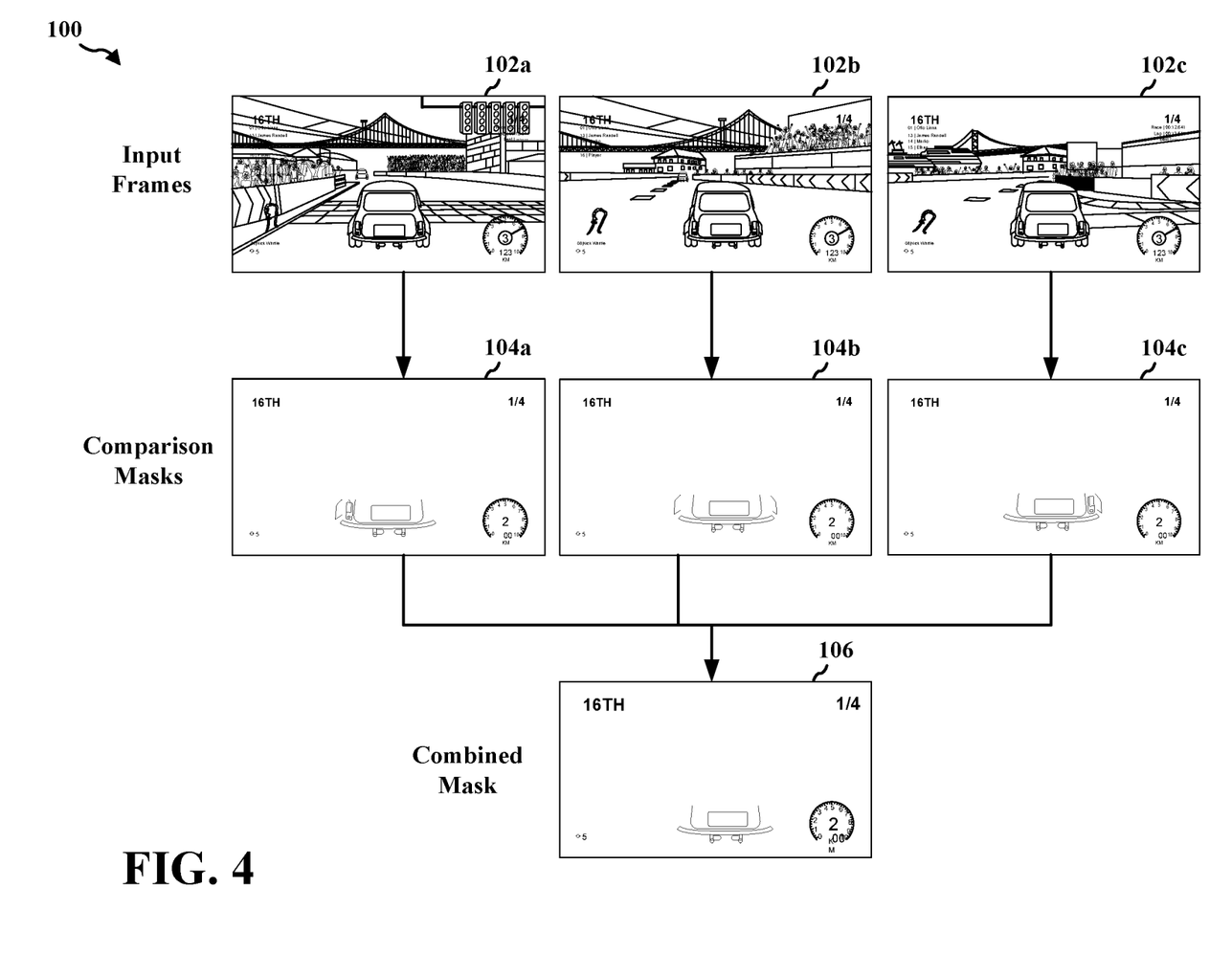
FIG. 4 illustrates a diagram of a mask generation procedure in accordance with one or more techniques of this disclosure.

FIG. 4 illustrates a diagram 400 of a mask generation procedure in accordance with one or more techniques of this disclosure. To generate the mask based on regions of the frame that include UI elements, a pairwise comparison of previously rendered frames may be performed to determine pixels that are unchanged among the previously rendered frames. A first input frame 402a, a second input frame 402b, and a third input frame 402c may be utilized for generating the mask. The input frames 402a-402c may be non-sequential frames (e.g., the input frames 402a-402c may have a temporal spacing of 50 frames). A first comparison mask 404a, a second comparison mask 404b, and a third comparison mask 404c, may be respectively generated based on the first input frame 402a, the second input frame 402b, and the third input frame 402c.

While the diagram 400 utilizes three previously rendered frames (e.g., input frames 402a-402c) associated with three different comparison masks 404a-404c, a different number of input frames and comparison masks may be determined in other examples. Separating the previously rendered frames in time may improve the quality of the mask, as UI elements may be static for many consecutive frames, while background content may be drawn differently over shorter periods of time as subsequent frames are drawn. Thus, the mask for the UI elements may not have to be updated at a full frame rate of the application. However, in some configurations, the input frames 402a-402c may correspond to one or more sequential frames and the comparison masks 404a-404c may be generated based on the one or more sequential frames.

A combined mask 406 may be generated based on a median value determined from the comparison masks 404a-404c generated via the pairwise comparison of the input frames 402a-402c. The combined mask 406 may include reduced noise in comparison to the first comparison mask 404a, the second comparison mask 404b, and the third comparison mask 404c, individually. Thus, the UI elements may be more effectively isolated from the background content based on the combined mask 406. While some portions of the input frames may include background content that does not change among the input frames 402a-402c, and is thus incorporated in the comparison masks 404a-404c and/or the combined mask 406, the composited frame may not be negatively impacted by the unchanged content, given that the pixels associated with the comparison masks 404a-404c and/or combined mask 406 may be the same as for the extrapolated frame.

Figure 5:
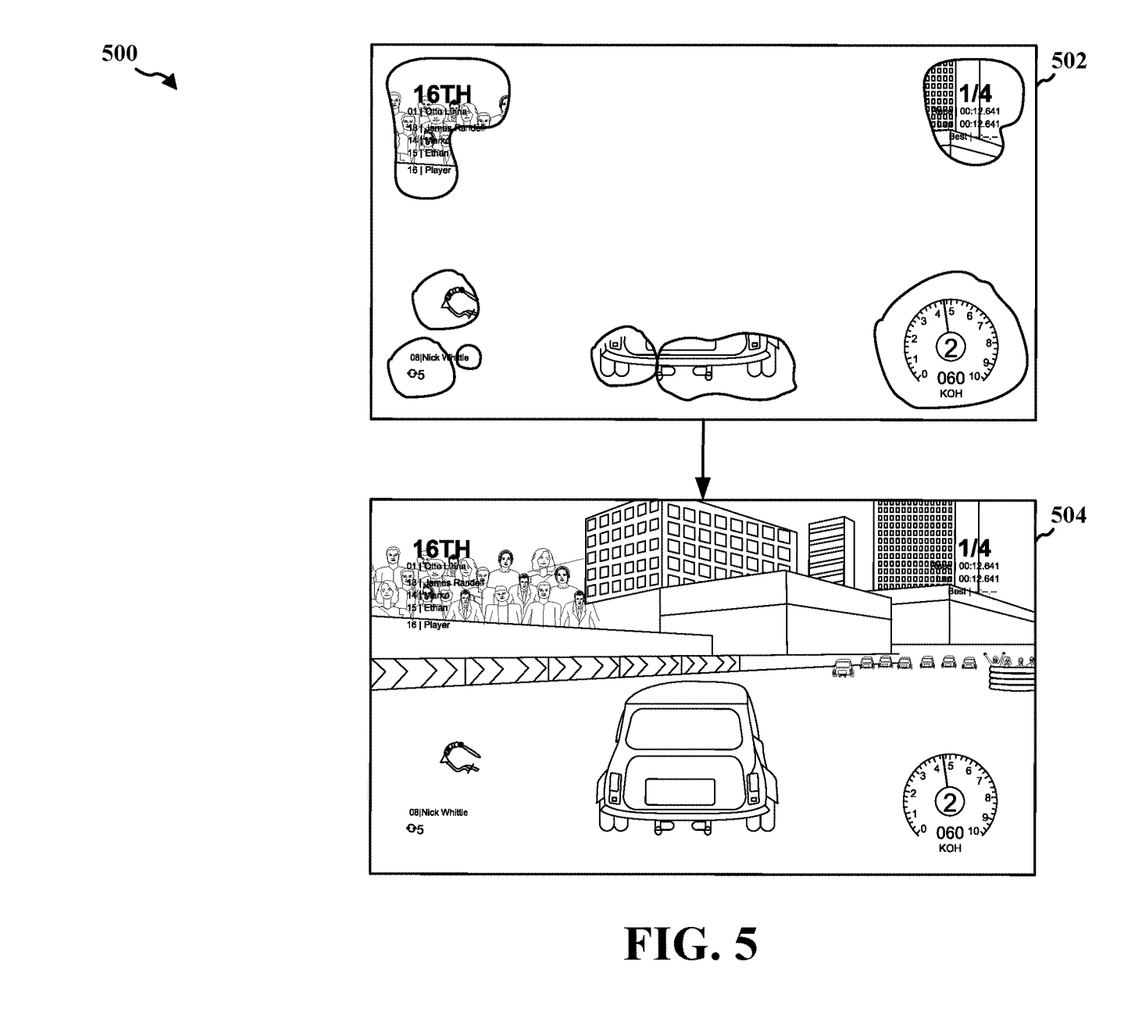
FIG. 5 illustrates a diagram of a frame composition procedure in accordance with one or more techniques of this disclosure.

FIG. 5 illustrates a diagram 500 of a frame composition procedure in accordance with one or more techniques of this disclosure. Prior to applying the combined mask to the extrapolated frame, the mask may be grown and feathered/blurred, at 502, to generate alpha channel data applied to masked regions of the frame that correspond to the distorted/static content. Even if a location of the UI elements is determined on a per pixel basis, distortions to the UI elements may cause the UI elements to be stretched to different pixels in the extrapolated frame than the UI elements corresponded to in the previously rendered frames. That is, the UI elements may be shifted by some amount of distortion around the UI elements. Thus, the mask may be grown and feathered/blurred, at 502, to not just cover the initially determined locations of the UI elements, but also to cover locations that may correspond to distortions of the UI elements.

The mask for the UI elements may be feathered/blurred, at 502, to provide a smooth transition between the masked content and the background content. In aspects, an intensity of the mask may be increased (e.g., strongly increased), followed by the mask being further blurred, followed by the intensity of the mask being further increased (e.g., slightly increased) to grow and feather/blur the mask, at 502. The intensity of the mask may be increased based on multiplying mask values for each pixel of the mask by a scale factor. A magnitude of the scale factor may be varied to provide the strong increase of the intensity or the slight increase of the intensity. The scale factor may be a constant value if the mask is stored in a linear color space, or a non-linear transfer function if the mask corresponds to a non-linear format or a non-linear color space. In this manner, the mask may be extended to cover regions of the frame where distortions of the UI elements may otherwise extend in the extrapolated frame. A smooth transition may also be provided between the UI elements and the background content based on such techniques.

The mask may be applied, at 504, on top of the extrapolated frame to provide the composited frame/modified extrapolated frame having the decreased number of artifacts and distortions. The masked regions of the composited frame may correspond to the stationary regions of the previously rendered frames. In examples, the grown and feathered/blurred mask may correspond to an overlay frame for the extrapolated frame, which may be generated, at 502, based on alpha data determined, for example, with respect to the most recently rendered frame (e.g., frame N−1). The overlay frame may be applied to the extrapolated frame, at 504, to provide the composited frame/modified extrapolated frame having the decreased number of artifacts and distortions. Edges of the masked regions of the overlay frame may be feather/blurred to blend the overlay frame with the initially extrapolated frame. That is, portions of the previous frame(s) that correspond to the overlay frame may be blended with the extrapolated frame. Corrupted regions of the extrapolated frame that include distorted UI elements may be covered, at 504, as the feathered/blurred alpha data may prevent hard transitions between the non-corrupted regions of the extrapolated frame and the masked regions of the overlay frame from being noticeable/perceivable by the end user.

Figure 6:
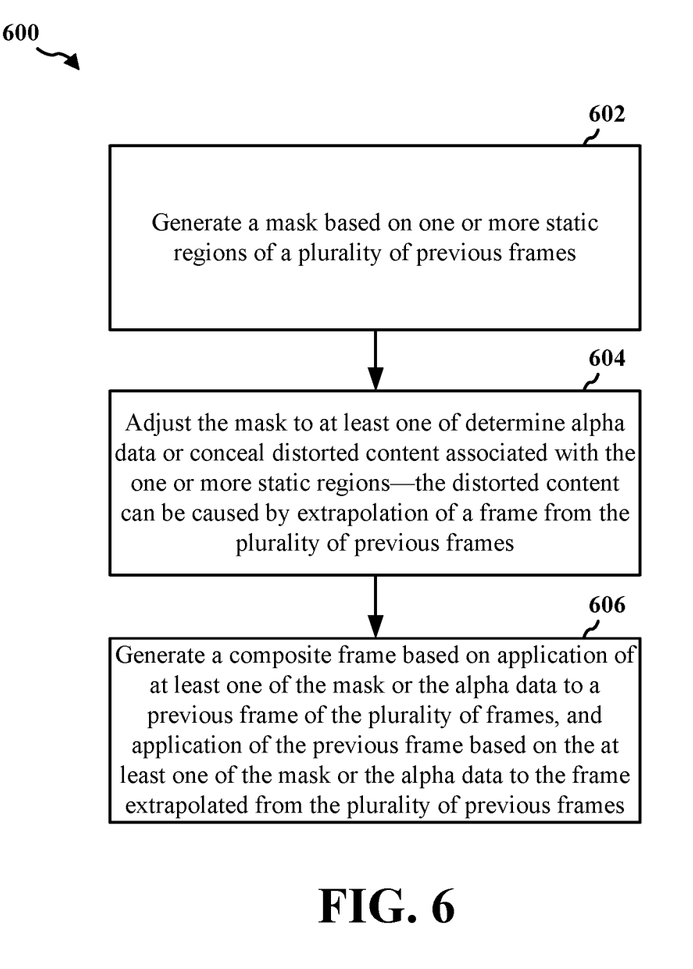
FIG. 6 is a flowchart of an example method of frame processing in accordance with one or more techniques of this disclosure.

FIG. 6 is a flowchart 600 of an example method of frame processing in accordance with one or more techniques of this disclosure. The method may be performed by an apparatus, such as an apparatus for frame processing, a frame processor, a CPU, a GPU, a display processor/DPU, a wireless communication device, and the like, as used in connection with the aspects of FIGS. 1-5.

At 602, the apparatus may generate a mask based on one or more static regions of a plurality of previous frames. For example, referring to FIGS. 2-4, the frame processor 202 may generate, at 208, a mask based on the static region(s) of the previous frame(s). In the diagram 300, the mask of the static regions may be generated, at 312. Further, step 604 may be performed by the frame composer 198.

At 604, the apparatus may adjust the mask to at least one of determine alpha data or conceal distorted content associated with the one or more static regions—the distorted content can be caused by extrapolation of a frame from the plurality of previous frames. For example, referring to FIG. 2, the frame processor 202 may adjust the mask, at 210a, to conceal artifacts and/or distortions associated with the static region(s). The frame processor 202 may subsequently determine, at 212, alpha data based on the adjustment to the mask, at 210a. In the diagram 300, the mask may be grown and feathered/blurred, at 314, for concealing artifacts associated with the extrapolated frame 310 and/or determining alpha data 316 (e.g., to generate, at 502, the grown and feathered/blurred mask of the diagram 500). Further, step 606 may be performed by the frame composer 198.

At 606, the apparatus may generate a composite frame based on application of at least one of the mask or the alpha data to a previous frame of the plurality of frames, and application of the previous frame based on the at least one of the mask or the alpha data to the frame extrapolated from the plurality of previous frames. For example, referring to FIGS. 2-3, the frame processor 202 may generate, at 214, the composite frame. In the diagram 300, the composite frame may be generated, at 318, based on the alpha data 316, frame N−1 302a, and the extrapolated frame 310. Further, step 616 may be performed by the frame composer 198.

Figure 7:
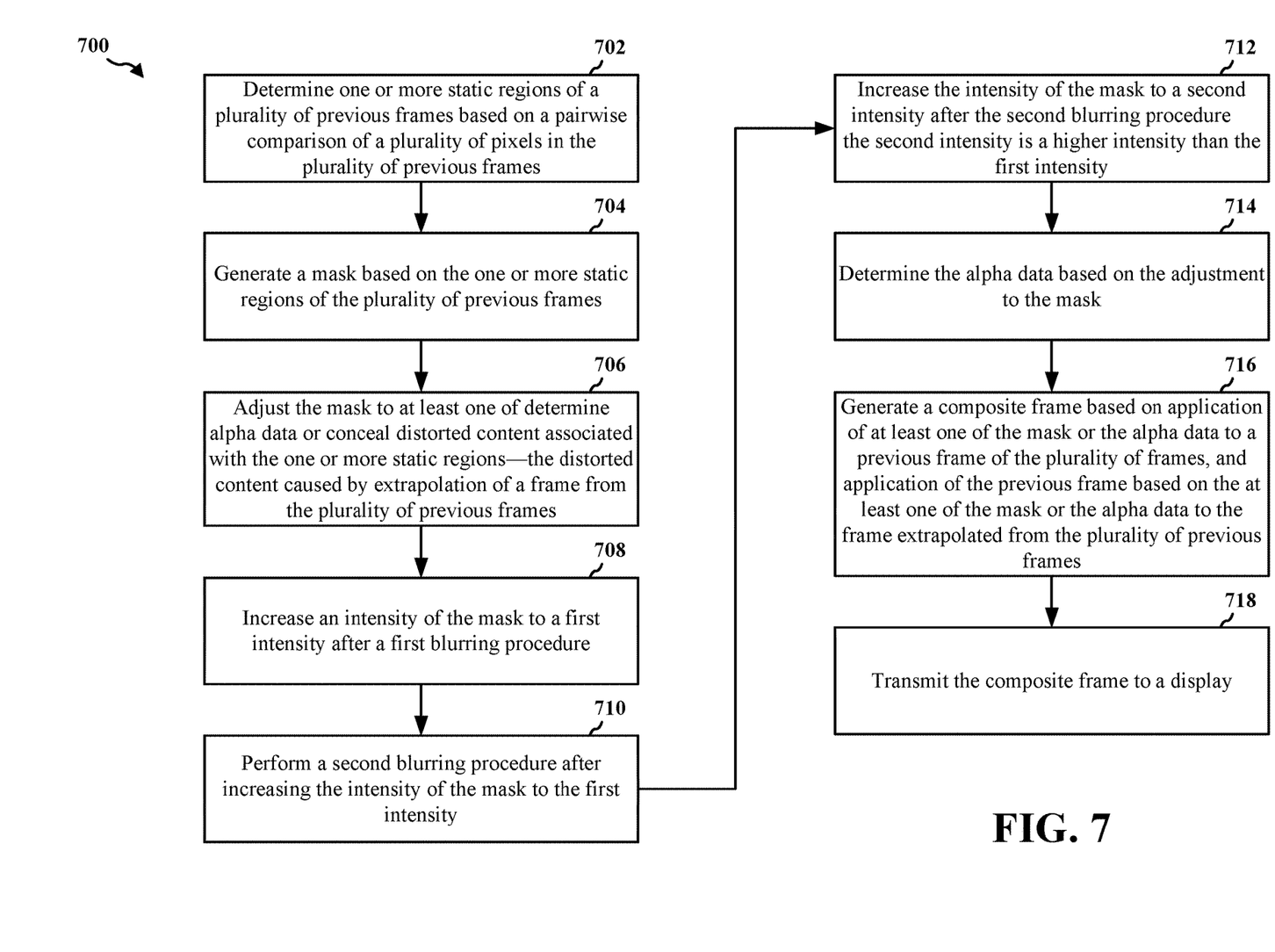
FIG. 7 is a flowchart of an example method of frame processing in accordance with one or more techniques of this disclosure.

FIG. 7 is a flowchart 700 of an example method of frame processing in accordance with one or more techniques of this disclosure. The method may be performed by an apparatus, such as an apparatus for frame processing, a frame processor, a CPU, a GPU, a display processor/DPU, a wireless communication device, and the like, as used in connection with the aspects of FIGS. 1-5.

At 702, the apparatus may determine one or more static regions of a plurality of previous frames based on a pairwise comparison of a plurality of pixels in the plurality of previous frames. For example, referring to FIG. 2, the frame processor 202 may determine, at 206, static region(s) of previous frame(s). Further, step 702 may be performed by the frame composer 198.

At 704, the apparatus may generate a mask based on the one or more static regions of the plurality of previous frames. For example, referring to FIGS. 2-4, the frame processor 202 may generate, at 208, a mask based on the static region(s) of the previous frame(s). Further, step 704 may be performed by the frame composer 198. In the diagram 300, the mask of the static regions may be generated, at 312. The one or more static regions may correspond to UI elements. In aspects, the mask (e.g., combined mask 406) may be generated based on a median value associated with a plurality of comparison masks (e.g., comparison masks 404a-404c) respectively generated from the plurality of previous frames (e.g., input frames 404a-404c). In further examples, the combined mask 406 may be generated based on other values associated with the plurality of comparison masks 404a-404c, such as average values or weighted values, where the weighted values may or may not be assigned a higher or lower weight based on how recent the input frames 402a-402c are to the current frame. The plurality of previous frames (e.g., input frames 404a-404c) may be sequential frames or non-sequential frames.

At 706, the apparatus may adjust the mask to at least one of determine alpha data or conceal distorted content associated with the one or more static regions—the distorted content can be caused by extrapolation of a frame from the plurality of previous frames. For example, referring to FIG. 2, the frame processor 202 may adjust the mask, at 210a, to conceal artifacts and/or distortions associated with the static region(s). The frame processor 202 may subsequently determine, at 212, alpha data based on the adjustment to the mask, at 210a. Further, step 706 may be performed by the frame composer 198. In the diagram 300, the mask may be grown and feathered/blurred, at 314, for concealing artifacts associated with the extrapolated frame 310 and/or determining the alpha data 316 (e.g., to generate, at 502, the grown and feathered/blurred mask of the diagram 500). Adjusting the mask, at 210a, may include at least one of expanding, at 210b(1) a size of a masked region of the mask, or blurring, at 210b(2) a transition between the masked region of the mask and an unmasked region of the mask (e.g., based on a first blurring procedure performed at 210b(2)(i)). The expanded size of the masked region may be greater than or equal to a size of the distorted content.

At 708, the apparatus may increase an intensity of the mask to a first intensity after a first blurring procedure. For example, referring to FIG. 2, the frame processor 202 may increase, at 210b(2)(ii), an intensity of the mask to a first intensity after performing, at 210b(2)(i), the first blurring procedure. Further, step 708 may be performed by the frame composer 198.

At 710, the apparatus may perform a second blurring procedure after increasing the intensity of the mask to the first intensity. For example, referring to FIG. 2, the frame processor 202 may perform, at 210b(2)(iii), a second blurring procedure after increasing, at 210b(2)(ii), the intensity of the mask to the first intensity. Further, step 710 may be performed by the frame composer 198.

At 712, the apparatus may increase the intensity of the mask to a second intensity after the second blurring procedure—the second intensity is a higher intensity than the first intensity. Blurring and intensifying the mask in increments may provide a smoother transition between the UI elements and the background content in comparison to performing all the blurring at once followed by all the intensification. For example, referring to FIG. 2, the frame processor 202 may increase, at 210b(2)(iv), the intensity of the mask to a second intensity higher than the first intensity after performing, at 210b(2)(iii), the second blurring procedure. Further, step 712 may be performed by the frame composer 198.

At 714, the apparatus may determine the alpha data based on the adjustment to the mask. For example, referring to FIGS. 2-3, the frame processor 202 may determine, at 212, alpha data based on the adjustment to the mask at 210a-210b. The alpha data 316 may be determined, at 212, based on the previous frame of the plurality of frames. The previous frame may be a most recently rendered frame (e.g., frame N−1 302a) of the plurality of previous frames. Further, step 714 may be performed by the frame composer 198. The alpha data 316 may be used to adjust an opaqueness around the edges of the masked regions of the previous frame, such that the masked regions of the previous frame may be overlaid on the extrapolated frame 310 to generate the composite frame, at 318.

At 716, the apparatus may generate a composite frame based on application of at least one of the mask or the alpha data to a previous frame of the plurality of frames, and application of the previous frame based on the at least one of the mask or the alpha data to the frame extrapolated from the plurality of previous frames. For example, referring to FIGS. 2-3, the frame processor 202 may generate, at 214, the composite frame. Further, step 716 may be performed by the frame composer 198. In the diagram 300, the composite frame may be generated, at 318, based on the alpha data 316, frame N−1 302a, and the extrapolated frame 310.

At 718, the apparatus may transmit the composite frame to a display. For example, referring to FIG. 2, the frame processor 202 may transmit, at 216, the composite frame to the display panel 204. Further, step 718 may be performed by the frame composer 198. The composite frame transmitted, at 216, may include at least one of less distortions or less UI artifacts than the frame extrapolated from the plurality of previous frames.

In configurations, a method or an apparatus for frame processing is provided. The apparatus may be a frame processor, a display processor, a DPU, a GPU, a CPU, or some other processor that may perform frame processing. In aspects, the apparatus may be the display processor 127 or the processing unit 120 within the device 104, which may include the frame composer 198, or may be some other hardware within the device 104 or another device. The apparatus may include means for generating a mask based on one or more static regions of a first set of frames of a plurality of previous frames; means for adjusting the mask to at least one of determine alpha data or conceal distorted content associated with the one or more static regions of the first set of frames, the distorted content caused by extrapolation of a frame from a second set of frames of the plurality of previous frames; and means for generating a composite frame based on application of at least one of the mask or the alpha data to a previous frame of the plurality of frames, and application of the previous frame based on the at least one of the mask or the alpha data to the frame extrapolated from the second set of frames of the plurality of previous frames. The apparatus may further include means for determining the one or more static regions based on a pairwise comparison of a plurality of pixels in the first set of frames of the plurality of previous frames. In aspects, the means for adjusting the mask may be further configured to at least one of expand a size of a masked region of the mask, or blur a transition between the masked region of the mask and an unmasked region of the mask based on a first blurring procedure. The apparatus may further include means for increasing an intensity of the mask to a first intensity after the first blurring procedure. The apparatus may further include means for performing a second blurring procedure after increasing the intensity of the mask to the first intensity; and means for increasing the intensity of the mask to a second intensity after the second blurring procedure, the second intensity being a higher intensity than the first intensity. The apparatus may further include means for determining alpha data based on the adjustment to the mask. The apparatus may further include means for transmitting the composite frame to a display.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of frame processing, including: generating a mask based on one or more static regions of a first set of frames of a plurality of previous frames; adjusting the mask to at least one of determine alpha data or conceal distorted content associated with the one or more static regions of the first set of frames, the distorted content caused by extrapolation of a frame from a second set of frames of the plurality of previous frames; and generating a composite frame based on application of at least one of the mask or the alpha data to a previous frame of the plurality of frames, and application of the previous frame based on the at least one of the mask or the alpha data to the frame extrapolated from the second set of frames of the plurality of previous frames.

Aspect 2 may be combined with aspect 1 and further includes determining the one or more static regions based on a pairwise comparison of a plurality of pixels in the first set of frames of the plurality of previous frames.

Aspect 3 may be combined with any of aspects 1-2 and includes that the mask is generated based on a median value associated with a plurality of comparison masks respectively generated from the first set of frames of the plurality of previous frames.

Aspect 4 may be combined with any of aspects 1-3 and includes that the first set of frames include non-sequential frames.

Aspect 5 may be combined with any of aspects 1-4 and includes that adjusting the mask further includes at least one of expanding a size of a masked region of the mask, or blurring a transition between the masked region of the mask and an unmasked region of the mask based on a first blurring procedure.

Aspect 6 may be combined with any of aspects 1-5 and includes that the expanded size of the masked region is greater than or equal to a size of the distorted content.

Aspect 7 may be combined with any of aspects 1-6 and further includes increasing an intensity of the mask to a first intensity after the first blurring procedure.

Aspect 8 may be combined with any of aspects 1-7 and further includes performing a second blurring procedure after increasing the intensity of the mask to the first intensity; and increasing the intensity of the mask to a second intensity after the second blurring procedure, the second intensity being a higher intensity than the first intensity.

Aspect 9 may be combined with any of aspects 1-8 and further includes determining the alpha data based on the adjustment to the mask.

Aspect 10 may be combined with any of aspects 1-9 and includes that the alpha data is based on the previous frame of the plurality of frames, the previous frame being a most recently rendered frame of the plurality of previous frames.

Aspect 11 may be combined with any of aspects 1-10 and further includes transmitting the composite frame to a display.

Aspect 12 may be combined with any of aspects 1-11 and includes that the composite frame includes at least one of less distortions or less UI artifacts than the frame extrapolated from the second set of frames of the plurality of previous frames.

Aspect 13 may be combined with any of aspects 1-12 and includes that the one or more static regions correspond to UI elements.

Aspect 14 is an apparatus for frame processing including at least one processor coupled to a memory and configured to implement a method as in any of aspects 1-13.

Aspect 15 may be combined with aspect 14 and includes that the apparatus is a wireless communication device.

Aspect 16 is an apparatus for frame processing including means for implementing a method as in any of aspects 1-13.

Aspect 17 is a computer-readable medium storing computer executable code, the code when executed by at least one processor causes the at least one processor to implement a method as in any of aspects 1-13.

Various aspects have been described herein. These and other aspects are within the scope of the following claims.

What is claimed is:
1. An apparatus for frame processing, comprising:
a memory; and
at least one processor coupled to the memory and configured to:
generate a mask based on one or more static regions of a first set of frames of a plurality of previous frames;
adjust the mask to conceal distorted content associated with the one or more static regions of the first set of frames, the distorted content caused by extrapolation of a frame from a second set of frames of the plurality of previous frames, wherein alpha data is further determined based on adjustment to the mask; and
generate a composite frame based on application of at least one of the mask or the alpha data to a previous frame of the plurality of frames, and application of the previous frame based on the at least one of the mask or the alpha data to the frame extrapolated from the second set of frames of the plurality of previous frames.

2. The apparatus of claim 1, wherein the at least one processor is further configured to determine the one or more static regions based on a pairwise comparison of a plurality of pixels in the first set of frames of the plurality of previous frames.

3. The apparatus of claim 1, wherein the mask is generated based on a median value associated with a plurality of comparison masks respectively generated from the first set of frames of the plurality of previous frames.

4. The apparatus of claim 3, wherein the first set of frames include non-sequential frames.

5. The apparatus of claim 1, wherein to adjust the mask the at least one processor is further configured to at least one of expand a size of a masked region of the mask, or blur a transition between the masked region of the mask and an unmasked region of the mask based on a first blurring procedure.

6. The apparatus of claim 5, wherein the expanded size of the masked region is greater than or equal to a size of the distorted content.

7. The apparatus of claim 5, wherein the at least one processor is further configured to increase an intensity of the mask to a first intensity after the first blurring procedure.

8. The apparatus of claim 7, wherein the at least one processor is further configured to:
perform a second blurring procedure after increasing the intensity of the mask to the first intensity; and
increase the intensity of the mask to a second intensity after the second blurring procedure, the second intensity being a higher intensity than the first intensity.

9. The apparatus of claim 1, wherein the alpha data is based on the previous frame of the plurality of frames, the previous frame being a most recently rendered frame of the plurality of previous frames.

10. The apparatus of claim 1, wherein the at least one processor is further configured to transmit the composite frame to a display.

11. The apparatus of claim 10, wherein the composite frame includes at least one of less distortions or less user interface (UI) artifacts than the frame extrapolated from the second set of frames of the plurality of previous frames.

12. The apparatus of claim 1, wherein the one or more static regions correspond to user interface (UI) elements.

13. The apparatus of claim 1, wherein the apparatus is a wireless communication device.

14. A method of frame processing, comprising:
generating a mask based on one or more static regions of a first set of frames of a plurality of previous frames;
adjusting the mask to conceal distorted content associated with the one or more static regions of the first set of frames, the distorted content caused by extrapolation of a frame from a second set of frames of the plurality of previous frames, wherein alpha data is further determined based on adjustment to the mask; and
generating a composite frame based on application of at least one of the mask or the alpha data to a previous frame of the plurality of frames, and application of the previous frame based on the at least one of the mask or the alpha data to the frame extrapolated from the second set of frames of the plurality of previous frames.

15. The method of claim 14, further comprising determining the one or more static regions based on a pairwise comparison of a plurality of pixels in the first set of frames of the plurality of previous frames.

16. The method of claim 14, wherein the mask is generated based on a median value associated with a plurality of comparison masks respectively generated from the first set of frames of the plurality of previous frames.

17. The method of claim 16, wherein the first set of frames include non-sequential frames.

18. The method of claim 14, wherein adjusting the mask includes at least one of expanding a size of a masked region of the mask, or blurring a transition between the masked region of the mask and an unmasked region of the mask based on a first blurring procedure.

19. The method of claim 18, wherein the expanded size of the masked region is greater than or equal to a size of the distorted content.

20. The method of claim 18, further comprising increasing an intensity of the mask to a first intensity after the first blurring procedure.

21. The method of claim 20, further comprising:
performing a second blurring procedure after increasing the intensity of the mask to the first intensity; and
increasing the intensity of the mask to a second intensity after the second blurring procedure, the second intensity being a higher intensity than the first intensity.

22. The method of claim 14, wherein the alpha data is based on the previous frame of the plurality of frames, the previous frame being a most recently rendered frame of the plurality of previous frames.

23. The method of claim 14, further comprising transmitting the composite to a display.

24. The method of claim 23, wherein the composite frame includes at least one of less distortions or less user interface (UI) artifacts than the frame extrapolated from the second set of frames of the plurality of previous frames.

25. The method of claim 14, wherein the one or more static regions correspond to user interface (UI) elements.

26. A non-transitory computer-readable medium storing computer executable code, the code when executed by at least one processor, causes the at least one processor to:
generate a mask based on one or more static regions of a first set of frames of a plurality of previous frames;
adjust the mask to conceal distorted content associated with the one or more static regions of the first set of frames, the distorted content caused by extrapolation of a frame from a second set of frames of the plurality of previous frames, wherein alpha data is further determined based on adjustment to the mask; and
generate a composite frame based on application of at least one of the mask or the alpha data to a previous frame of the plurality of frames, and application of the previous frame based on the at least one of the mask or the alpha data to the frame extrapolated from the second set of frames of the plurality of previous frames.

* * * * *